United States Patent [19]

Wood

[11] Patent Number: 4,632,754

[45] Date of Patent: Dec. 30, 1986

[54] DESALINATION APPARATUS

[75] Inventor: Robert S. Wood, Gosport, United Kingdom

[73] Assignee: Plessey Overseas Limited, Ilford, United Kingdom

[21] Appl. No.: 540,762

[22] Filed: Oct. 11, 1983

[30] Foreign Application Priority Data

Oct. 12, 1982 [GB] United Kingdom ............... 8229133

[51] Int. Cl.$^4$ ............................................. B01D 13/00
[52] U.S. Cl. .................................. 210/257.2; 210/409; 210/446.1; 210/433.2
[58] Field of Search .................... 210/134, 136, 416.1, 210/433.2, 34.1, 409, 257.2

[56] References Cited

U.S. PATENT DOCUMENTS 4,367,140  1/1983  Wilson .......................... 210/134 X
4,432,876  2/1984  Keefer ........................ 210/416.1 X

FOREIGN PATENT DOCUMENTS 1212917  11/1970  United Kingdom ............. 210/416.1
1509338   5/1978  United Kingdom ............. 210/416.1
2030056   4/1980  United Kingdom ............. 210/416.1
2088968   6/1982  United Kingdom ............. 210/416.1

Primary Examiner—Frank Spear
Attorney, Agent, or Firm—Fleit, Jacobson, Cohn & Price

[57] ABSTRACT

Reverse osmosis liquid filtration apparatus, which apparatus comprises an inlet conduit, a reverse osmosis chamber, a pump for pumping liquid to be filtered from the liquid inlet conduit to the reverse osmosis chamber, a reverse osmosis membrane positioned in the reverse osmosis chamber and dividing the reverse osmosis chamber into a first portion for containing concentrated unfiltered liquid and a second portion for containing filtered liquid that has passed through the reverse osmosis membrane, a first outlet conduit which extends from the second portion of the reverse osmosis chamber and which is for the filtered liquid, a reservoir, reservoir separator means, a second outlet conduit for concentrated unfiltered liquid, and valve means.

6 Claims, 4 Drawing Figures

DESALINATION APPARATUS

This invention relates to reverse osmosis liquid filtration apparatus. The apparatus is especially but not exclusively useful for the desalination of sea water.

In reverse osmosis apparatus where a quantity of liquid has to be filtered from a larger quantity of unfiltered liquid, it is customary to pump the total quantity of unfiltered liquid to a pressure high enough to induce to a flow through a reverse osmosis membrane in a reverse osmosis chamber. After the filtered liquid has emerged from the reverse osmosis chamber, its pressure energy is either wasted by throttling it down to inlet pressure before discharging it, or it is passed through an energy recovery system which returns a proportion of the pressure energy to a pump drive motor. The most efficient energy recovery systems presently known only have an efficiency of 50%.

It is an aim of the present invention to provide reverse osmosis liquid filtration apparatus which avoids wasting power by doing unnecessary work on the input liquid to be filtered and which has a good efficiency.

Accordingly, this invention provides reverse osmosis liquid filtration apparatus, which apparatus comprises an inlet conduit, a reverse osmosis chamber, a pump for pumping liquid to be filtered from the inlet conduit to the reverse osmosis chamber, a reverse osmosis membrane positioned in the reverse osmosis chamber and dividing the reverse osmosis chamber into a first portion for containing concentrated unfiltered liquid and a second portion for containing filtered liquid that has passed through the reverse osmosis membrane, a first outlet conduit which extends from the second portion of the reverse osmosis chamber and which is for the filtered liquid, a reservoir, reservoir separator means, a second outlet conduit for concentrated unfiltered liquid, and valve means, the reservoir separator means and the valve means acting in co-operation in use of the apparatus on a forward movement of the reservoir separator means to allow unfiltered liquid to enter the reservoir on a first side of the reservoir separator means and to substantially simultaneously expel from the apparatus concentrated unfiltered liquid on a second side of the reservoir separator means, and the reservoir separator means acting in use of the apparatus on a return movement of the reservoir separator means to cause the unfiltered liquid on the first side of the reservoir separator means to flush the first portion of the reverse osmosis chamber to wash concentrated unfiltered liquid from the first portion of the reverse osmosis chamber and into the reservoir on the second side of the reservoir separator means, which concentrated unfiltered liquid is then expelled from the reservoir and the apparatus via the second outlet conduit on the next repeated forward movement of the reservoir separator means.

The apparatus of the invention relies on the fact that when a virtually incompressible liquid is stored in a virtually inelastic reservoir, it is possible to change the pressure level of the liquid with only a minimal expenditure of energy.

The apparatus of the invention can be used to separate various substances from carrier fluids. As indicated above, one use of the apparatus of the invention is to separate salt from water as in the desalination of sea water.

In one embodiment of the invention, the valve means comprises a first valve for admitting unfiltered liquid from the inlet conduit to the reservoir on the first side of the reservoir separator means, a second valve for admitting unfiltered liquid from the reservoir on the first side of the reservoir separator means to the first portion of the reverse osmosis chamber, and a third valve having a first position in which concentrated unfiltered liquid is admitted from the reservoir on the second side of the reservoir separator means to the second outlet conduit, and a second position in which unfiltered liquid from the reservoir on the first side of the reservoir separator means together with concentrated unfiltered liquid from the first portion of the reverse osmosis chamber is admitted to the reservoir on the second side of the reservoir separator means.

The third valve is preferably a spool valve.

The third valve may be operated by a toggle mechanism.

The toggle mechanism may comprise a rod, a pair of spaced apart abutment members, and a toggle arm connected to the third valve.

In the said first embodiment of the invention, the reservoir separator means is preferably a piston.

The piston and the toggle mechanism may be operated through gearing from the pump.

In a second embodiment of the invention, the valve means is a platvalve.

The plate valve may be operated by a pressure operated vane actuator, the vane actuator operating on pressure differences generated within the apparatus during use of the apparatus.

The pressure differences may be caused by the reservoir emptying and filling.

If desired, the plate valve may be operated by a cam and gear box arrangement.

In the said second embodiment of the invention, the reservoir separator means is preferably a diaphragm.

In the second embodiment of the invention, the apparatus preferably includes a second pump for drawing liquid from the first portion of the reverse osmosis chamber and for delivering the liquid to the second side of the reservoir separator means.

Embodiments of the invention will now be described solely by way of example and with reference to the accompanying drawings in which.

Figure 1:
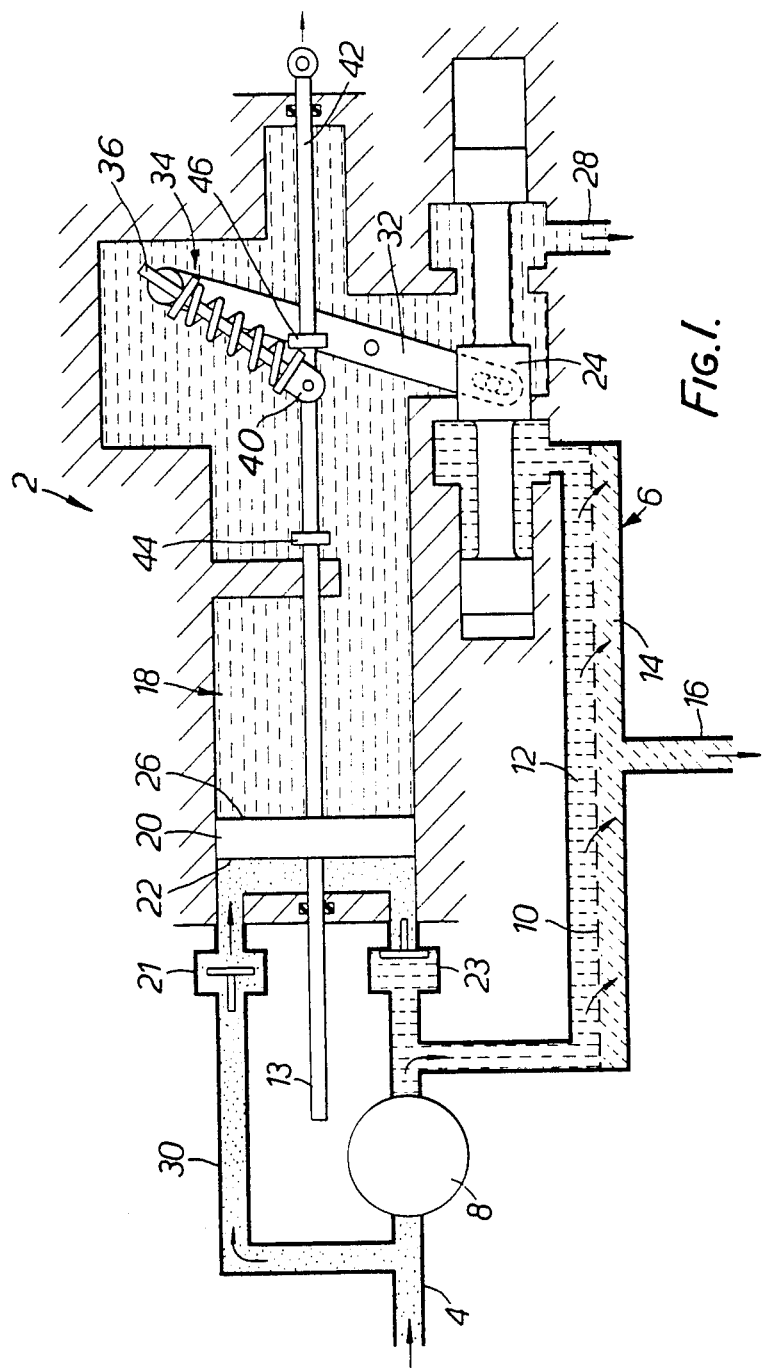
FIGS. 1 and 2 show first reverse osmosis liquid filtration apparatus.
Figure 2:
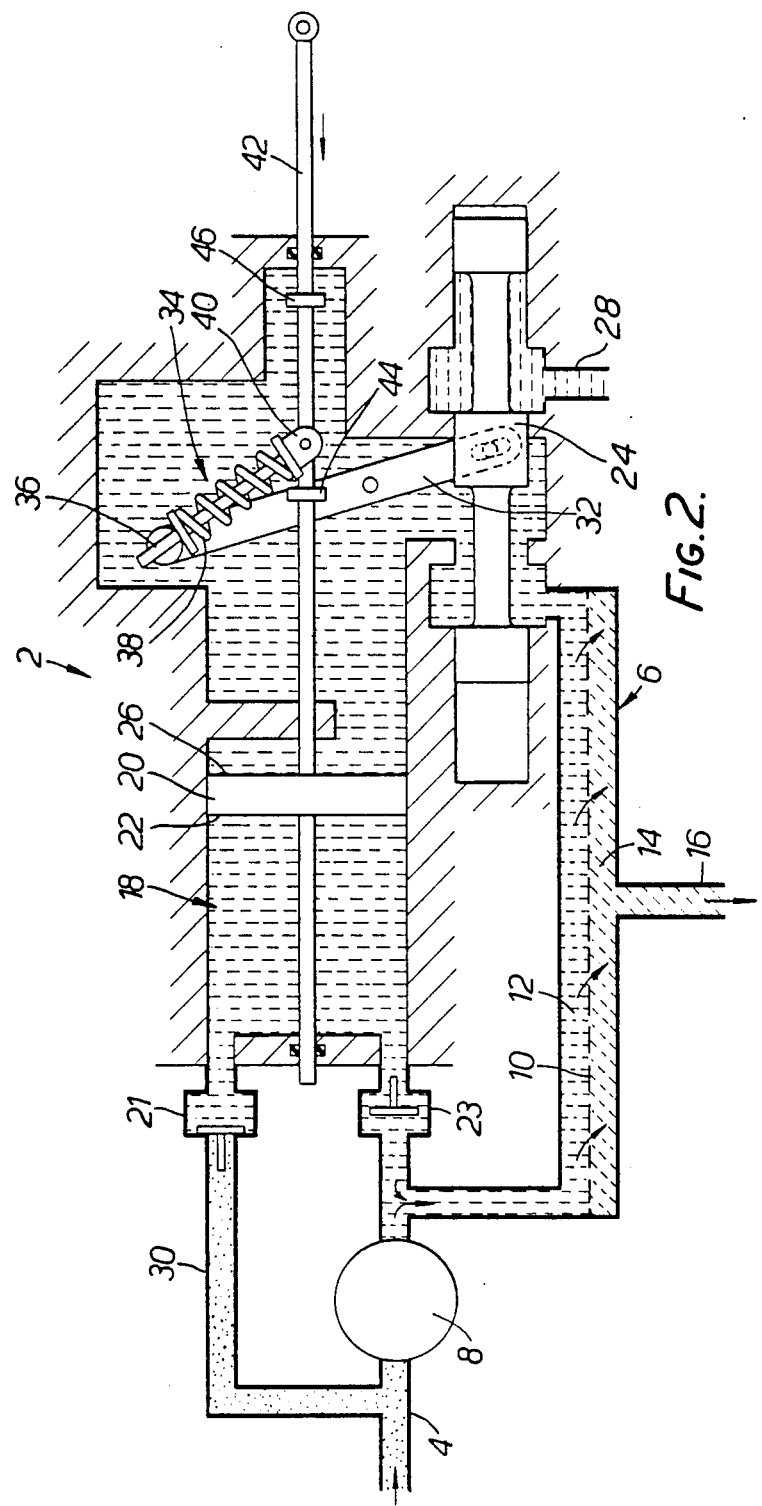

Referring to FIGS. 1 and 2, there is shown reverse osmosis liquid filtration apparatus 2, which apparatus comprises an inlet conduit 4, a reverse osmosis chamber 6 and a pump 8 for pumping liquid to be filtered from the inlet conduit 4 to the reverse osmosis chamber 6. A reverse osmosis membrane 10 is positioned in the reverse osmosis chamber 6 and divides the reverse osmosis chamber 6 into a first portion 12 for containing concentrated unfiltered liquid and a second portion 14 for containing filtered liquid that has passed through the reverse osmosis membrane 10. The reverse osmosis chamber 6 is provided with a first outlet conduit 16 from the second portion 14 of the reverse osmosis chamber 6 for the filtered liquid.

The apparatus 2 further comprises a reservoir 18 and reservoir separator means in the form of a piston 20.

The apparatus 2 further comprises valve means in the form of a first valve 21 for admitting unfiltered liquid from the inlet conduit 4 to the reservoir 18 on a first side 22 of the piston 20. The valve means also comprises a second valve 23 for admitting unfiltered liquid from the reservoir 18 on the first side 22 of the piston 20 to the first portion 12 of the reverse osmosis chamber 6. The valve means further comprises a third valve 24 in the form of a spool valve having a first position illustrated in Figue 1 in which concentrated unfiltered liquid is admitted from the reservoir 18 on a second side 26 of the piston 20 to a second outlet conduit 28 from the reservoir 18 and the apparatus 2. The third valve 24 has a second position as illustrated in FIG. 2 in which unfiltered liquid from the reservoir 18 on the first side 22 of the piston 20 together with concentrated unfiltered liquid from the first portion 12 of the reverse osmosis chamber 6 is admitted to the reservoir 18 on the second side 26 of the piston 20.

In use of the apparatus 2, the piston 20 and the valve means constituted by the first valve 21, the second valve 23 and the third valve 24 co-operate on a forward movement (from left to right as shown in FIGS. 1 and 2) of the piston 20 to induce unfiltered liquid into the reservoir 18 along the inlet conduit 4 and a further conduit 30, the liquid in the conduit 30 travelling past the first valve 21 into the reservoir 18 on the first side 22 of the piston 20. On this forward movement of the piston 20, the piston 20 is effective substantially simultaneously to expel from the apparatus 2 via the second outlet conduit 28 concentrated unfiltered liquid on the second side 26 of the piston 20.

The piston 20 acts in use of the apparatus 2 on its return movement to cause the unfiltered liquid on the first side 22 of the piston 20 to flush the first portion 12 of the reverse osmosis chamber 6 to wash concentrated unfiltered liquid from the first portion 12 of the reverse osmosis chamber 6 and into the reservoir 18 on the second side 26 of the piston 20. It will be apparent that this concentrated unfiltered liquid that is washed into the reservoir 18 on the second side 26 of the piston 20 is then expelled as stated above on the next repeated forward movement of the piston 20.

As the piston 20 moves forwards and backwards, the third valve 24 has to move from the position illustrated in FIG. 1 to the position illustrated in FIG. 2. The position of the spool valve 24 in FIG. 1 occurs when the piston 20 is on its forward movement. The position of the third valve 24 shown in FIG. 2 occurs when the piston 20 is on its reverse movement. In order to effect movement of the third valve 24, the third valve 24 is connected to a toggle arm 32 of a toggle mechanism 34. The toggle mechanism 34 includes a rod 36 which has a spring. The rod 36 terminates in a holder 40 which slides along a rod 42. The rod 42 is provided with a pair of spaced apart abutment members 44, 46. The rod 42 is connected to the piston 20 so that the rod 42 moves with the piston 20. At the end of the forward movement of the piston 20, the abutment member 44 as shown in FIG. 2 engages the toggle mechanism 34 and causes the third valve 24 to shift to its position shown in FIG. 2. The liquid on both sides of the piston 20 is now in communication with the high pressure liquid in the reverse osmosis chamber 6. At the end of the return stroke of the piston 20, the other abutment member 46 resets the toggle to position the spool valve 24 in the position shown in FIG. 1 for the next induction stroke.

The pump 8 is a high pressure pump. The pump 8 can be any form of pump capable of handling liquid of up to 1,000 psi. For small desalination apparatus, the pump 8 may be a hand driven piston pump, in which case the rod 42 may be directly coupled to the hand driven piston pump 8. If the pump 8 is a high speed rotary pump, the rod 42 may be driven by a crank through a reduction gear (not shown) to the pump drive.

When the apparatus 2 is used as desalination apparatus, pure water will pass out of the first outlet conduit 16.

Figure 3:
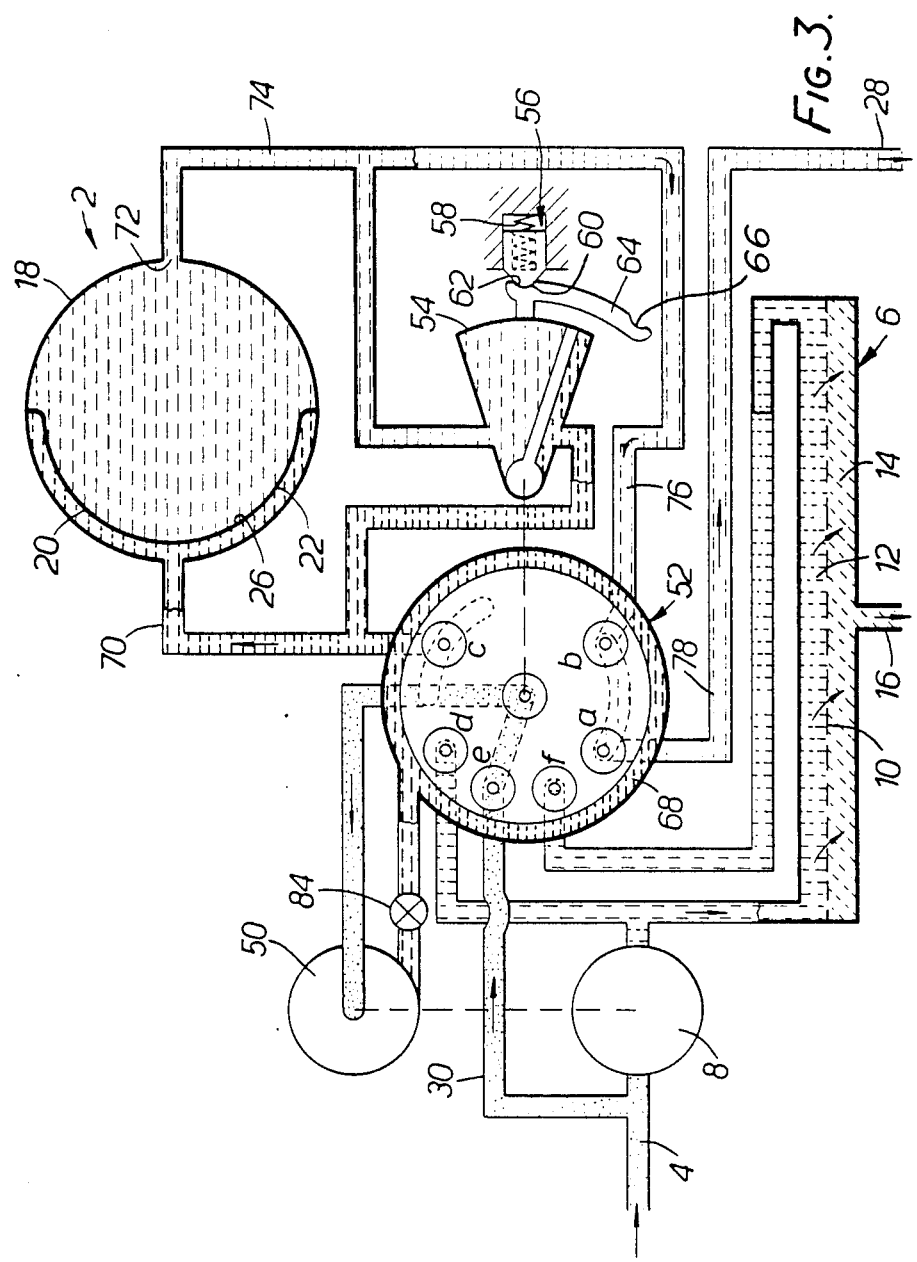
FIGS. 3 and 4 show second reverse osmosis liquid filtration apparatus.
Figure 4:
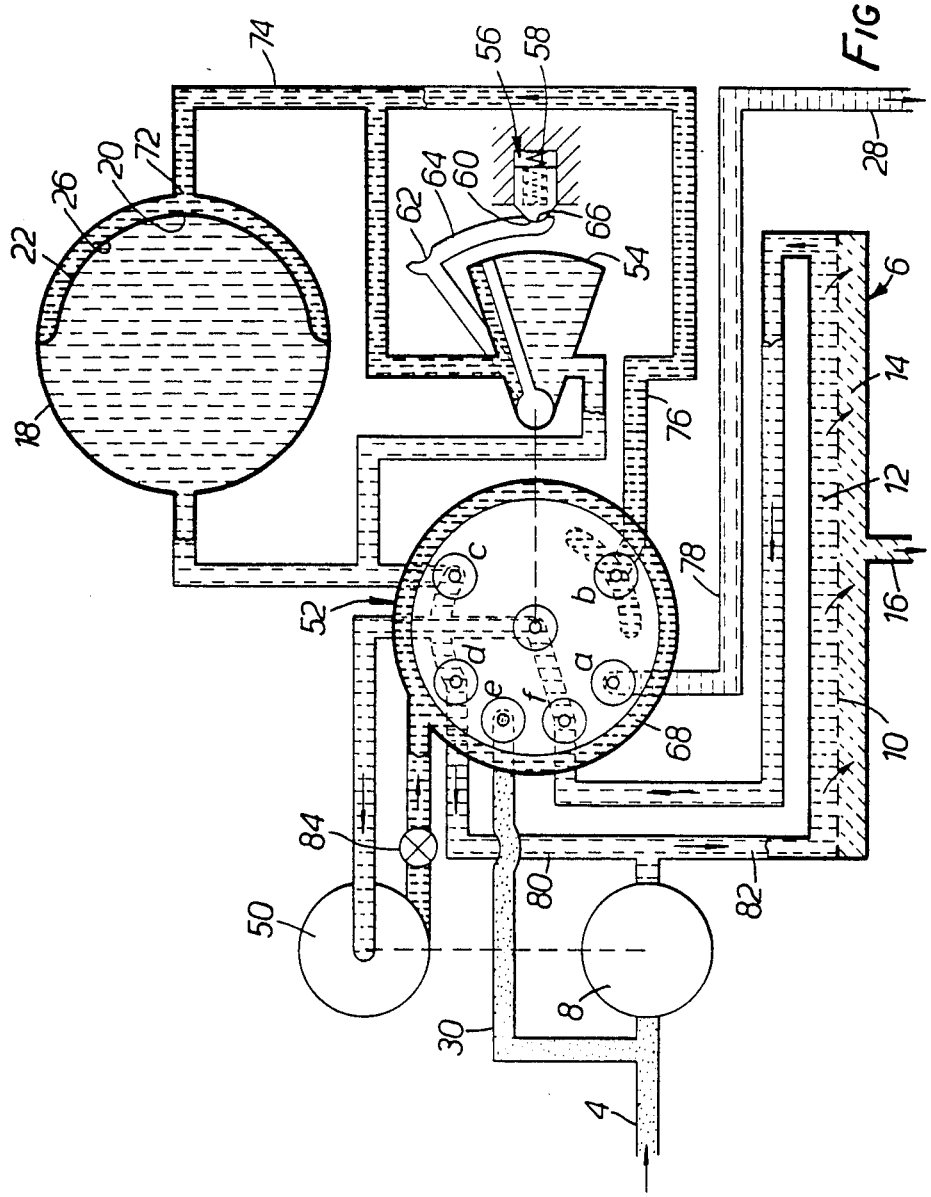

Referring now to FIGS. 3 and 4, the apparatus 2 illustrated in FIGS. 3 and 4 fulfills the same function as the apparatus 2 shown in FIGS. 1 and 2. Both types of apparatus 2 operate on the same basic principle and give approximately the same efficiency. In FIGS. 3 and 4, similar parts as in FIGS. 1 and 2 have been given the same reference numeral and their precise construction and operation will not again be given.

In FIGS. 3 and 4, the reservoir 18 is shown as a circular reservoir 18. Also in FIGS. 3 and 4, the motive power for the liquid recirculation flow becomes a continuously driven second pump 50. The pump 50 is preferably a centrifugal pump but any other form of pump with a self-limiting pressure rise can be used, for example a positive displacement pump with a pressure relief valve.

In FIGS. 3 and 4, instead of the valve means 21, 23, 24 a single valve means is employed in the form of a rotary plate valve 52. The plate valve 52 forms the switching functions but any other arrangement of poppet or slide valves can be used. Ports e and f on the plate valve 52 perform the function performed by the valves 21 and 23 shown in FIGS. 1 and 2. Ports a, b and c, d perform the function of the valve 24 shown in FIGS. 1 and 2. The plate valve 52 is switched at the end of each cycle by a vane type actuator 54 driven by a sprung detent 56. As can be seen from FIGS. 3 and 4, the detent 56 includes a spring 58 and a nose portion 60 of the detent 56 locates in a depression 62 in an arm 64 of the vane type actuator 54 as shown in FIG. 3, and locates in another depression 66 in the arm 64 as shown in FIG. 4.

As an alternative to the vane type actuator 54 and the detent 56, the plate valve 52 may be switched at the end of each cycle by a cam (not shown) driven by a gear box (not shown). The vane type actuator 54 with its detent 56, and the cam with its gear box, fulfill the same function as the toggle mechanism 34 shown in FIGS. 1 and 2.

The apparatus 2 illustrated in FIGS. 3 and 4 operates such that liquid, for example sea water, passes through the inlet conduit 4 into the high pressure pump 8 and into the reverse osmosis chamber 6 containing the reverse osmosis membrane 10. The filtered liquid is discharged through the first outlet conduit 16 as described above with reference to FIGS. 1 and 2.

In order to provide the much greater circulation flow of liquid required, the second pump 50 draws the extra required liquid through the port e of the plate valve 52 and discharges the liquid into a passage 68 surrounding the plate valve 52. The liquid passes from this passage 68 through the port c into the reservoir 18 on a first side 22 of a diaphragm 20 which takes the place of the piston 20 shown in FIGS. 1 and 2. The water is separated from the existing content of the reservoir 18 by the diaphragm 20, this existing liquid content of the reservoir 18 being on a second side 26 of the diaphragm 20. As the liquid from the passage 68 passes along conduit 70 and into the reservoir 18 on the first side 22 of the diaphragm 20, the liquid on the second side 26 of the diaphragm 20 is substantially simultaneously discharged via the ports a and b of the plate valve 52 and out through the second outlet conduit 28 of the apparatus 2.

After a given time, the incoming liquid entering the reservoir 18 on the first side 22 of the diaphragm 20 will have displaced all of the contents of the reservoir 18 and the diaphragm 20 will have moved to the right hand side of the reservoir 18 as illustrated in FIG. 4. In this position, the diaphragm 20 blocks a port 72 that leads via conduits 74, 76 and 78 to the second outlet conduit 28. Furthermore, the vane type actuator 54 (or the gear box when it is employed) will have rotated the plate valve 52 to the position shown in FIG. 4.

In the position of the plate valve 52 shown in FIG. 4, the pump 50 is now able to draw high pressure liquid, containing concentrated impurities such for example as salt, from the first portion 12 of the reverse osmosis chamber 6. This liquid can be drawn through the port f of the plate valve 52 and it can be delivered via the port b of the plate valve 52, the conduits 76, 74 and the port 72 to the reservoir 18 on the second side 26 of the diaphragm 20.

The low pressure liquid that was pumped into the reservoir 18 on the first side 22 of the diaphragm 20 during the previous cycle and is now as shown in FIG. 4 occupying the majority of the reservoir 18, is now at high pressure. As the concentrated unfiltered liquid from the first portion 12 of the reverse osmosis chamber 6 enters the reservoir 18 via the port 72, the liquid in the reservoir 18 on the first side 22 of the diaphragm 20 is discharged via the ports c and d of the plate valve 52 and the conduits 80, 82 into the first portion 12 of the reverse osmosis chamber 6 to provide the circulation flow required to remove the excess impurities, for example salt, from the first portion 12 of the reverse osmosis chamber 6. This flow enters the pump 50 via the port f of the plate valve 52 and is delivered via the port b to the reservoir 18 on the second side 26 of the diaphragm 22, where it provides the motive power to expel the cleaned water through the membrane 10 and out of the first outlet conduit 16.

After a time, the reservoir 18 will be filled with liquid containing the excess impurities, and the flow will be stopped due to a pressure rise in the apparatus 2 and the stalling pressure of the pump 50 having been reached. During this time, the plate valve 52 will have been rotated to its position shown in FIG. 3 so that it will be reset and ready for the next low pressure cycle of the apparatus 2.

Flow from the pump 50 can be via a restricter valve 84 if desired.

The apparatus 2 illustrated in FIGS. 1 and 2 and FIGS. 3 and 4 is particularly advantageous for allowing continuous pumping of water for desalination combined with discontinuous flow for scavenging out of the separated salt. This offers the advantage that the apparatus can be mechanised to a large scale, using for example, continuously driven rotary pumps.

It is to be appreciated that the embodiments of the invention described above have been given by way of example only and that modifications may be effected. Thus, for example, further apparatus 2 could be constructed using various parts of the two types of apparatus 2 illustrated in the drawings.

I claim:

1. Reverse osmosis liquid filtration apparatus, which apparatus comprises an inlet conduit, a reverse osmosis chamber, a pump for pumping liquid to be filtered from the inlet conduit to the reverse osmosis chamber, a reverse osmosis membrane positioned in the reverse osmosis chamber and dividing the reverse osmosis chamber into a first portion in communication with said inlet conduit for containing concentrated unfiltered liquid and a second portion for containing filtered liquid that has passed through the reverse osmosis membrane, a first outlet conduit which extends from the second portion of the reverse osmosis chamber and which is for the filtered liquid, a reservoir, reservoir separator means movable within the reservoir for dividing the reservoir into a first reservoir portion and a second reservoir portion, a second outlet conduit extending from the first portion of the reverse osmosis chamber for concentrated unfiltered liquid, and valve means in the form of a unitary plate valve including a housing having a plurality of outlets and a plurality of inlets communicating with the first portion of the reverse osmosis chamber, with the first reservoir portion, with the second reservoir portion, and with the second outlet conduit, and a rotatable plate member within said housing to provide communication between selected ones of said inlets and selected ones of said outlets for controlling the flow of liquids to and from the first portion of the reverse osmosis chamber and to and from the reservoir, the reservoir separator means and the valve means acting in co-operation in use of the apparatus on a forward movement of the reservoir separator member to allow unfiltered liquid to enter the first reservoir portion on a first side of the reservoir separator means and to substantially simultaneously expel from the second reservoir portion and through the valve means concentrated unfiltered liquid on a second side of the reservoir separator means, and the reservoir separator means acting in use of the apparatus on a return movement of the reservoir separator means and to cause the unfiltered liquid in the first reservoir portion on the first side of the reservoir separator means to enter the first portion of the reverse osmosis chamber to flush the first portion of the reverse osmosis chamber to wash concentrated unfiltered liquid from the first portion of the reverse osmosis chamber through the valve means and into the second reservoir portion on the second side of the reservoir separator means, which concentrated unfiltered liquid is then expelled from the second reservoir portion through the valve means and from the apparatus via the second outlet conduit on the next repeated forward movement of the reservoir separator means.

2. Apparatus according to claim 1 in whicthe plate valve is operated by a pressure operated vane actuator, the vane actuator operating on pressure differences generated within the apparatus during use of the apparatus.

3. Apparatus according to claim 2 in which the pressure differences are caused by the reservoir emptying and filling.

4. Apparatus according to claim 1 in which the plate valve is operated by a cam and gear box arrangement.

5. Apparatus according to claim 1 in which the reservoir separator means is a diaphragm.

6. Apparatus according to claim 1 and including a second pump for drawing liquid from the first portion of the reverse osmosis chamber and for delivering the liquid to the second side of the reservoir separator means.

* * * * *